(12) United States Patent
Sawayanagi

(10) Patent No.: US 6,325,667 B2
(45) Date of Patent: Dec. 4, 2001

(54) MODULAR CONNECTOR FITTING STRUCTURE

(75) Inventor: Masahiro Sawayanagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/742,380

(22) Filed: Dec. 22, 2000

(30) Foreign Application Priority Data

Dec. 24, 1999 (JP) ................................. 11-367315

(51) Int. Cl.$^7$ ................................. H01R 13/60
(52) U.S. Cl. .................. 439/537; 439/557; 439/801; 439/34
(58) Field of Search .................... 439/289, 555, 439/801, 546, 553, 537, 567, 660, 34, 36; 403/348, 349, 274, 279, 282; 248/27.1, 27.3; 411/339, 512, 508, 509

(56) References Cited

U.S. PATENT DOCUMENTS

| 5,256,841 | * | 10/1993 | Zanella | 248/27.1 |
| 5,484,186 | * | 1/1996 | Van Order et al. | 439/34 |
| 5,624,167 | * | 4/1997 | Katz | 248/27.1 |

FOREIGN PATENT DOCUMENTS

| 63-72115 | 5/1988 | (JP) | B60J/3/02 |
| 7-47839 | 2/1995 | (JP) | B60J/3/02 |
| 11-78521 | 3/1999 | (JP) | B60J/3/02 |
| 11-507309 | 6/1999 | (JP) | B60J/3/00 |

* cited by examiner

*Primary Examiner*—Renee Luebke
*Assistant Examiner*—Felix O. Figueroa
(74) *Attorney, Agent, or Firm*—Sughrue, Mion, Zinn, Macpeak & Seas, PLLC

(57) ABSTRACT

Projections 9a, 9b are provided on a lower face of a circumferential area of a bore 14 in a connector 3. When a wire insertion tube 5 of a bracket 2 is fitted in the bore 14, the bracket 2 and the connector 3 can be tightly fitted due to elastic forces created when a peripheral part of the wire insertion tube 5 is deflected by action of the projections 9a, 9b.

5 Claims, 9 Drawing Sheets

MODULAR CONNECTOR FITTING STRUCTURE

BACKGROUND OF THE INVENTION

The present invention relates to a fitting structure for a modular connector for fitting the modular connector to a vehicle panel for the purpose of supplying electric power to vehicle interior articles such as sun visors, vehicle room lamps, and so on when they are mounted on a roof trim to be integral therewith.

The vehicle sun visor has originally been a sun shading plate which is mounted inside the vehicle in order to cut off sunlight. However, due to recent increase of women drivers, there have appeared some sun visors which are provided with mirrors and lamps on sun visor bodies.

In such a sun visor, an electric wire for power supply is connected to a modular connector which is provided on a shaft for supporting the sun visor for conduction of electricity from a battery source to the lamps.

FIGS. 8A to 8C are sectional views showing respective steps of fitting such connector to the vehicle panel covered with the roof trim.

A connector 30 consists of a bracket 32 provided with a wire insertion tube 35, a lead-in electric wire 40a guided out from the wire insertion tube 35, and a joint connector (female type) 41a attached to the electric wire 40a.

On the other hand, a power supply electric wire 40b held between an inner panel 37 covered with a roof trim 36 and an outer panel 38 of the vehicle body is guided out through a fitting hole 37a formed in the inner panel 37, and a joint connector (male type) 41b is attached to an end of the electric wire 40b (FIG. 8A).

In the next step, the joint connector 41a and the joint connector 41b are mated, and the mated joint connectors 41a, 41b are inserted into a space between the inner panel 37 and the outer panel 38. Then, the bracket 32 is fitted to the fitting hole 37a in the inner panel 37 (FIG. 8B).

Thereafter, the bracket 32 is fixed to the inner panel 37 by means of screws or the like. The joint connectors 41a, 41b are positioned at an approximately middle part between the inner panel 37 and the outer panel 38 and brought into a mechanically and electrically stabilized state (FIG. 8C).

However, in fitting the above described connector 30 to the inner panel 37, the joint connector 41b on the vehicle side is once drawn out through the fitting hole 37a in the inner panel 37 to make a connection between the joint connectors 41a, 41b. For this reason, each of the electric wires 40a and 40b is provided with an excess length in addition to a determined length.

Accordingly, there has been a probability that the joint connectors 41a, 41b may be damaged by getting caught between the inner panel 37 and the outer panel 38, or the electric wires 40a, 40b may be bitten between the inner panel 37 or the outer panel 38 and the joint connectors 41a, 41b.

Further, considering that the joint connectors 41a, 41b are drawn out from the inner panel 37, the joint connectors 41a, 41b are provided with sufficient excess length.

For this reason, the joint connectors 41a, 41b become unstable, and there is an anxiety that the joint connectors 41a, 41b abutted against the inner panel 37 or the outer panel 38 may issue a strange noise or get damaged.

Furthermore, in case where the joint connectors 41a, 41b and the bracket 32 are separate bodies as in the related structure, connection of the connectors 41a, 41b and mount of the bracket 32 are individually conducted, and the work for fitting them becomes complicated.

Therefore, in order to eliminate such drawbacks, provided that an integral article is constructed by assembling the connectors 41a, 41b and the bracket 32 in advance, the fitting work will be extremely simple.

However, in case where the connectors 41a, 41b and the bracket 32 are molded as separate components in advance and thereafter assembled, there will be a probability that a backlash may occur between the connectors 41a, 41b and the bracket 32 due to influence of their molding precision and a strange noise may occur while the vehicle is running.

SUMMARY OF THE INVENTION

The invention has been made in view of the above described circumstances, and it is an object of the invention to provide a fitting structure for a modular connector in which a catch of the joint connectors and a bite of the electric wires will be prevented, and at the same time, workability of fitting the modular connector can be enhanced and occurrence of the strange noise will be prevented.

In order to achieve the above object, according to the present invention, there is provided a vehicle connector module comprising:

a bracket including a base plate and a tube portion protruded from the base plate;

a first electric wire inserted through the tube portion, extended along an outer peripheral face of the tube portion and fixed on the base plate of the bracket;

a plate-shaped connector provided with a bore to which the tube portion of the bracket is inserted to be engaged with the bracket, and provided with a slit so formed as to surround a part of an outer peripheral portion of the bore such that the outer peripheral portion is deformable in a radial direction of the bore when the bracket and the connector are engaged with each other; and a second electric wire inserted through the bore of the connector and fixed on a face opposing to the base plate of the bracket.

In this configuration, since an inner face of the bore comes in elastic contact with the tube portion of the bracket, there will be created angle adjusting feeling on occasion of engagement and positioning, and at the same time, a backlash of the wire insertion tube in a radial direction will be eliminated, thereby preventing the strange noise due to the backlash.

Furthermore, since the electric wire drawn out from the tube portion is fixed on the bracket per se, there is no need of the excess length of the electric wire. Therefore, the catch of the joint connectors between the inner panel and the outer panel of the vehicle, and the bite of the electric wire attributed to the presence of the excess length of the electric wire will be prevented.

Preferably, a protrusion is formed on the outer peripheral portion of the bore of the connector such that the protrusion is abutted against the base plate of the bracket such that the outer peripheral portion of the bore surrounded by the slit in the connector is deformable in an axial direction of the tube portion of the bracket when the bracket and the connector are engaged with each other.

In this configuration, when the bracket is engaged with the connector, the circumferential area of the bore is deflected by an amount of height of the projection to create the elastic forces, whereby the bracket and the connector are tightly fitted in a reliable manner. Accordingly, a backlash in an engaging direction between the bracket and the connector (an axial direction of the tube portion) will be eliminated, and thus, the strange noise due to the backlash will be prevented.

Preferably, the slit is formed into an arc shape surrounding a part of the outer peripheral portion of the bore of the connector.

In this configuration, since the substantially uniform elastic forces are created on the inner wall of the bore around which the arcuate slits are formed, the tube portion is pressed with the substantially uniform elastic forces, whereby the backlash can be reliably eliminated.

Preferably, a rib member is formed on the outer peripheral face of the tube portion of the bracket, and a positioning recess and a locking recess are formed on an inner face of the bore of the connector. The rib member is first engaged with the positioning recess when the tube portion of the bracket is inserted into the though hole of the connector, and the tube portion is then rotated such that the positioning rib is fitted into the locking recess.

In this configuration when the bracket is engaged with the connector, the bracket can be relatively simply and accurately positioned on the connector by engagement between the rib member and the positioning recess. In this case, by separately providing the positioning recess and the locking recess, a locked condition and an unlocked condition can be easily recognized. Therefore, efficiency of the fitting work of the modular connector can be enhanced.

Preferably, a first terminal provided on a leading end of the first electric wire and a second terminal provided on a leading end of the second electric wire are arranged so as to oppose to each other when the bracket and the connector are engaged with each other. A screw for combining the bracket and the connector is pierced through the first and second terminals to electrically connect with each other.

Moreover, since the excess length of the first electric wire will be minimized to stabilize the joint connectors, and occurrence of the strange noises due to abutment between the joint connectors and the vehicle panel or the outer wall panel will be prevented.

Further, there will be no backlash between the bracket and the connector, they are engaged relatively simply and accurately, and the working efficiency will be enhanced.

DETAILED DESCRIPTION OF THE PREFERRED EMBODIMENTS

Figure 1:
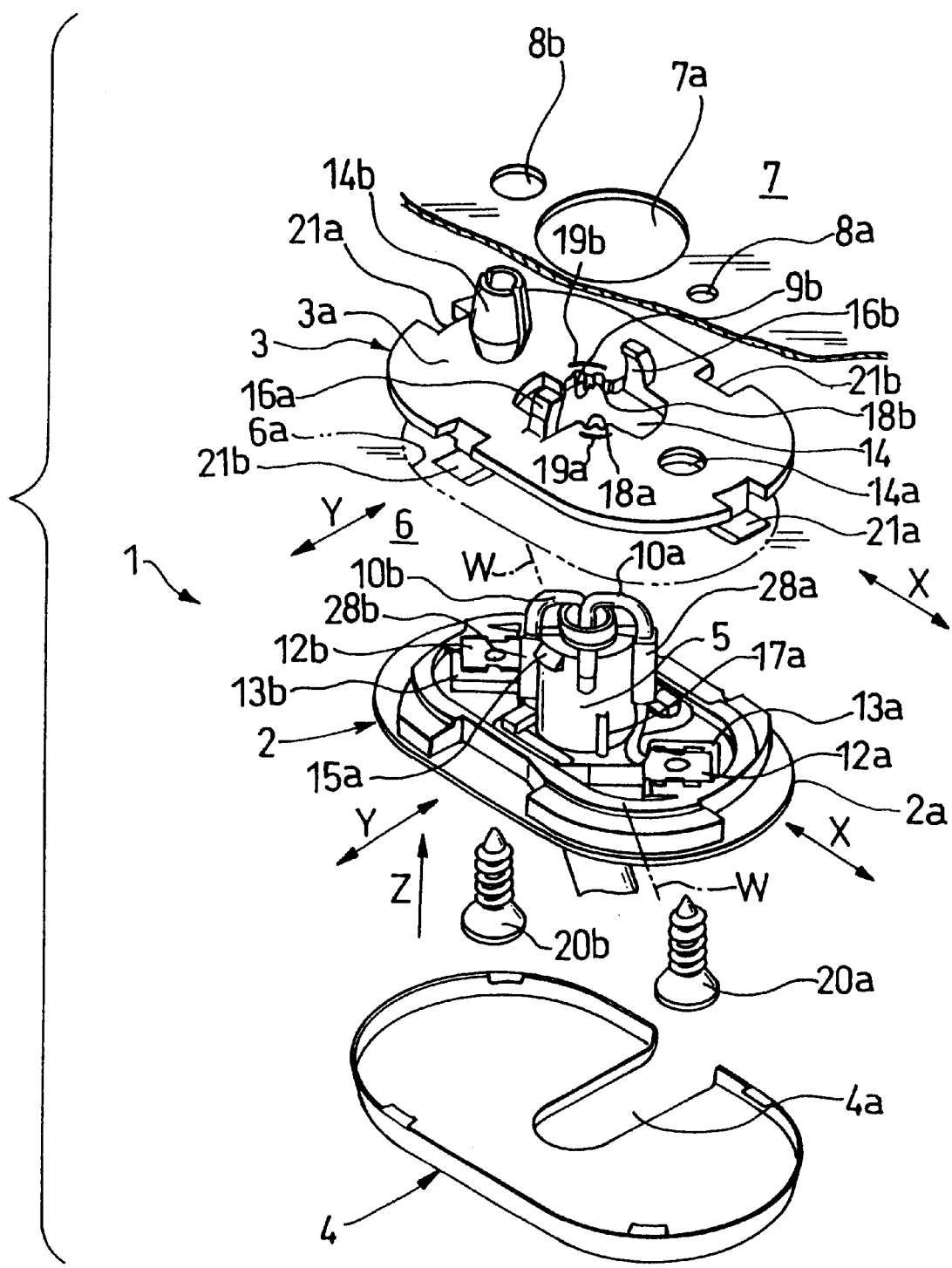
FIG. 1 is an exploded perspective view showing one embodiment of a modular connector fitting structure according to the invention.

Now, the modular connector fitting structure according to the invention will be described in detail by way of examples referring to the drawings.

Figure 2A:
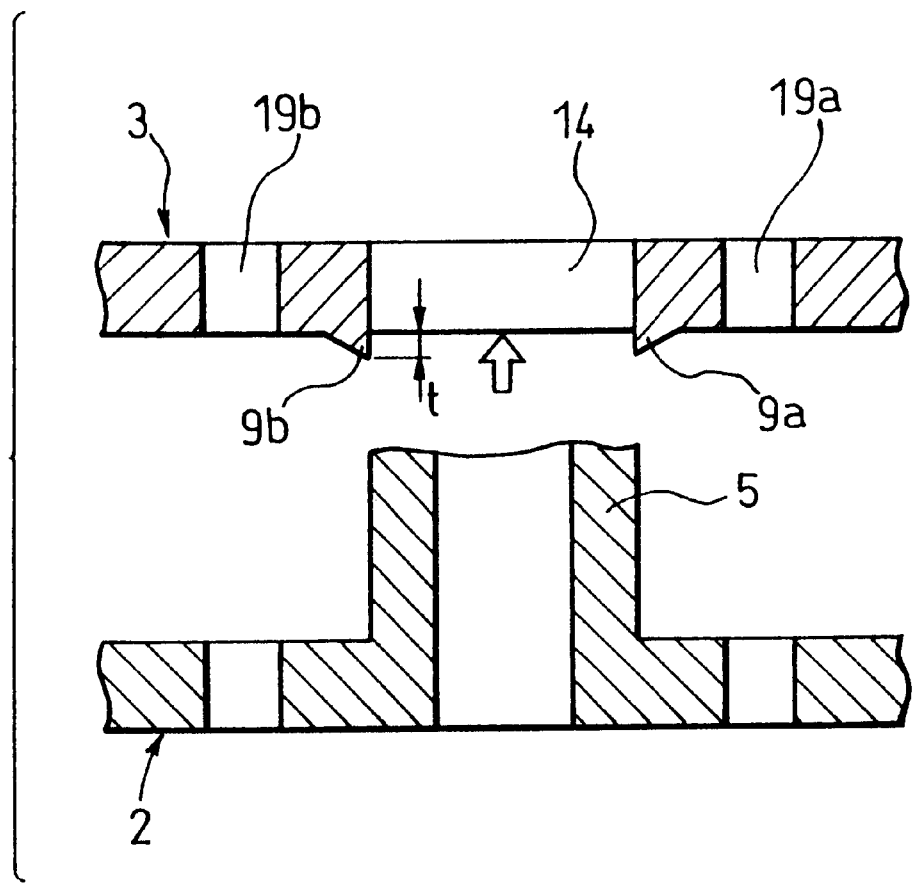
FIGS. 2A and 2B and enlarged sectional views of an essential part showing a state before and after a bracket in FIG. 1 is engaged with a connector, taken along a line 2B—2B in FIG. 3.
Figure 2B:
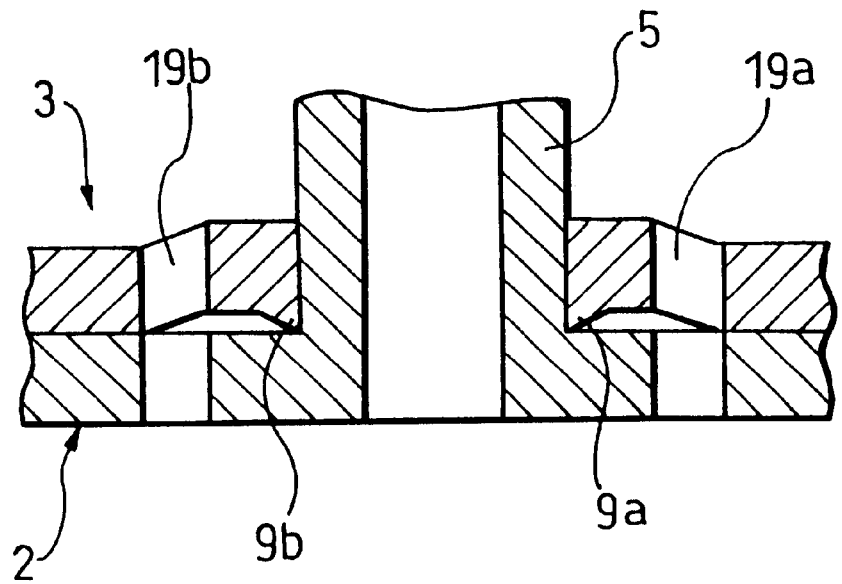

FIG. 1 to FIGS. 2A, B show an embodiment of the modular connector fitting structure according to the invention. FIG. 1 is an exploded perspective view of a general structure, FIG. 2A is an enlarged sectional view of an essential part in a state before a bracket is engaged with a connector, and FIG. 2B is an enlarged sectional view of the essential part in a state after the bracket has been engaged with the connector.

As shown in FIG. 1, a modular connector 1 in this embodiment comprises, as main components, a bracket 2, a connector 3 on which the bracket 2 is adapted to be mounted, and a cover 4 adapted to cover a vehicle room side of the bracket 2.

The bracket 2 consists of a bracket body 2a in an oval shape made of synthetic resin, and a wire insertion tube 5 in a cylindrical shape which is provided at a central part of the bracket body 2a so as to project therefrom.

The wire insertion tube 5 extends in a fitting direction Z in which the modular connector 1 is fitted to a vehicle panel 7 covered with a roof trim 6. On an outer peripheral wall of the wire insertion tube 5, are integrally provided wire holders 28a, 28b in a shape of a prism.

There are also provided on the outer peripheral wall of the wire insertion tube 5, locking hooks 15a, 15b in a triangular shape in cross section in a shorter diameter direction Y of the bracket body 2a, integrally with (or adjacent to) the wire holders 28a, 28b. The locking hooks 15a, 15b are adapted to engage with locking arms 16a, 16b which will be described hereinafter and serve as stoppers, when the bracket 2 is mounted on the connector 3.

Because upper faces of the locking hooks 15a, 15b are slanted, the locking arms 16a, 16b temporarily ride on the locking hooks 15a, 15b and are elastically deformed when the wire insertion tube 5 is inserted and pushed into a bore 14, and thereafter, the locking arms 16a, 16b are restored to the original shape to be engaged with the locking hooks 15a, 15b.

The bracket body 2a having the wire insertion tube 5 is provided with recesses 13a, 13b in which terminals 12a, 12b are received, on both sides in a longitudinal direction X of the bracket body 2a.

In the recesses 13a, 13b, are received the terminals 12a, 12b which are connected to ends of the electric wires 10a, 10b extending from the wire insertion tube 5 to the wire holders 28a, 28b.

In other words, the terminals 12a, 12b connected to the ends of the electric wires 10a, 10b which are guided out from the wire holders 28a, 28b are mounted on a surface of the bracket body 2a on both sides interposing the wire insertion tube 5.

On the other hand, the connector 3 includes a connector body 3a in an oval shape made of synthetic resin or the like, and the bore 14 in a contorted circular shape which is formed at a central part of the connector body 3a.

As shown in FIG. 2, there are provided projections 9a, 9b at a lower face of a circumferential area of the bore 14. The projections 9a, 9b are in a triangular shape in cross section as shown in FIGS. 2A and 2B, and a projected amount t is about 0.4 to 0.5 mm. The projected amount t is set larger than an amount of the backlash due to molding in an engaging direction.

Around the bore 14, the locking arms 16a, 16b which are in a form of elastically projecting pieces and adapted to be engaged with the locking hooks 15a, 15b are integrally provided on both ends in a shorter diameter direction Y of the connector body 3a.

Moreover, positioning ribs 17a, 17b are formed on the outer peripheral wall of the wire insertion tube 5 along an approximately diagonal line W of the oval shaped bracket 2 and in a fitting direction Z.

Figure 3:
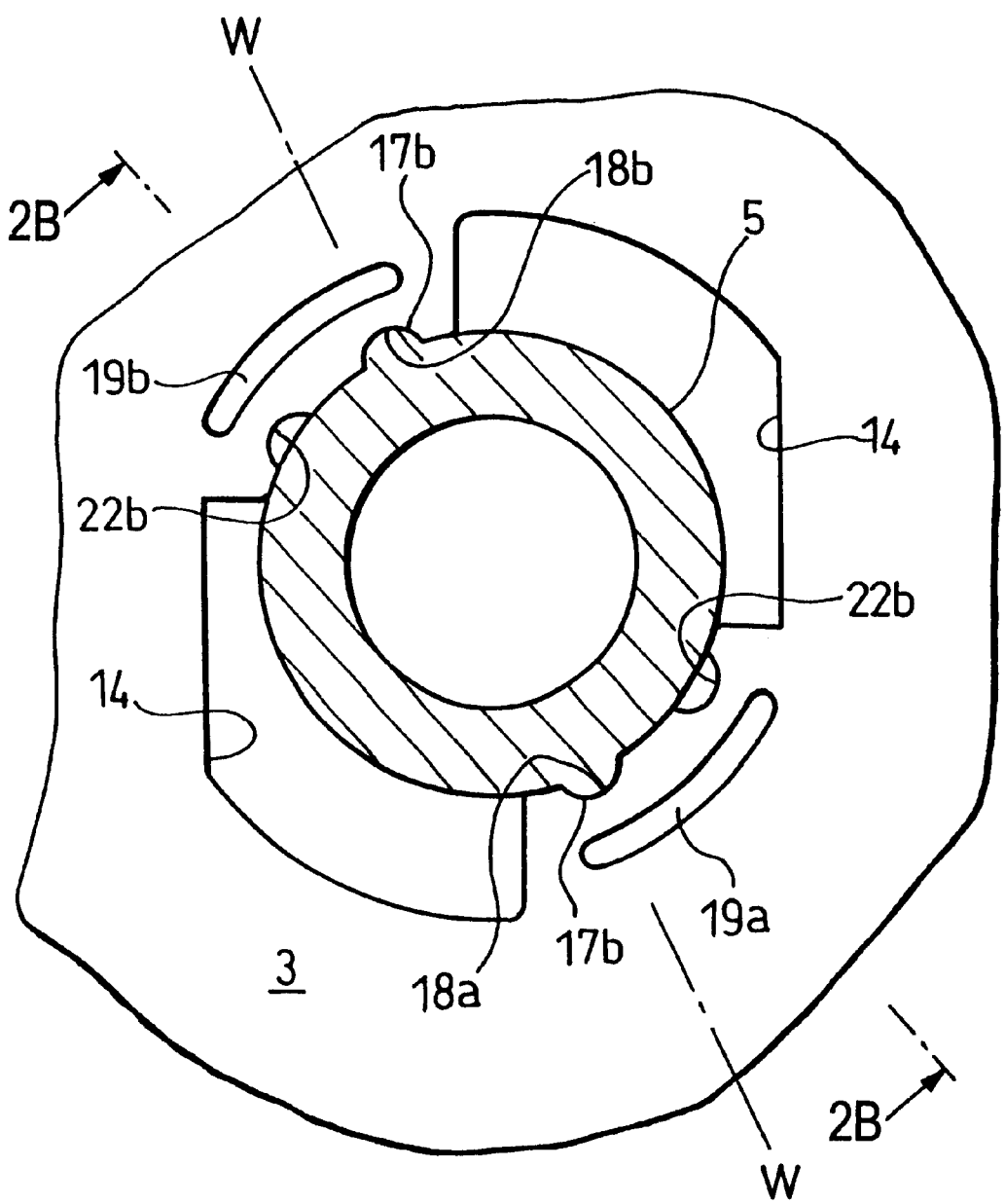
FIG. 3 is an enlarged sectional view of the essential part showing a state where the bracket in FIG. 1 has been engaged with the connector.

In the meantime, as shown in FIG. 3, the connector 3 is provided around the bore 14 with positioning recesses 18a, 18b which are adapted to be engaged with the positioning ribs 17a, 17b along an approximately diagonal line W of the oval shaped connector 3.

On a part of the bore 14 in which the positioning recesses 18a, 18b are formed, there are also provided positioning recesses 22a, 22b for releasing lock adjacent to the positioning recesses 18a, 18b. When the bracket 2 is rotated with respect to the connector 3, and the positioning ribs 17a, 17b are engaged with the lock releasing positioning recesses 22a, 22b, the locking hooks 15a, 15b and the locking arms 16a, 16b are also rotated to disengage the lock.

In order to increase elasticity around the bore 14, there are formed slits 19a, 19b in an arcuate shape near the outer circumference of the bore 14 where the positioning recesses 18a, 18b are formed.

Depth of the positioning recesses 18a, 18b is equal to height of the positioning ribs 17a, 17b, but a diameter of a circle whose circumference lies on the deepest parts of the positioning recesses 18a, 18b is slightly smaller than a diameter of a circle whose circumference lies on the top parts of the positioning ribs 17a, 17b so that the positioning ribs 17a, 17b can be press-fitted into the positioning recesses 18a, 18b.

When the bracket 3 is engaged with the bore 14, the positioning ribs 17a, 17b are fitted into the positioning recesses 18a, 18b to be positioned, and the positioning ribs 17a, 17b and adjacent area are elastically pressed onto the wall face of the bore 14.

Also on both ends in a longer diameter direction X of the connector body 3a, is formed a projected locking member 14b which is adapted to be engaged in a fitting hole 8b formed in the vehicle panel 7, and a screw insertion hole 14a which is coaxial with a fitting hole 8a formed in the vehicle panel 7.

Although not shown in the drawings, on a back face of the connector 3 at a position where the locking member 14b is formed, there is provided a recess in which a terminal connected to a power supply electric wire on a side of a joint connector is received.

Additionally, on both ends of the longer diameter direction X and the shorter diameter direction Y of the connector body 3a, are respectively provided locking pieces 21a, 21b in a substantially L-shape in cross section for locking the roof trim 6.

Then, the modular connector 1 in which the bracket 2 has been mounted on the connector 3 by inserting the wire insertion tube 5 of the bracket 2 into the bore 14 of the connector 3 fitted to the roof trim 6 is attached to the vehicle panel 7. Thus, the modular connector 1 is fitted to the vehicle panel 7 by tightening screws 20a, 20b. Thereafter, the decorative cover 4 having a cut-out 4a through which a visor mounting shaft is passed is attached to the vehicle room side of the bracket 2.

FIGS. 4 to 7 are sectional views showing respective steps of attaching the modular connector 1 to the vehicle panel 7.

First, the lead-in electric wires 10a, 10b connected to the sun visor are guided out from the wire insertion tube 5 of the bracket 2, and the terminals 12a, 12b fitted to the ends of the electric wires 10a, 10b are respectively received in the recesses 13a, 13b.

Figure 4:
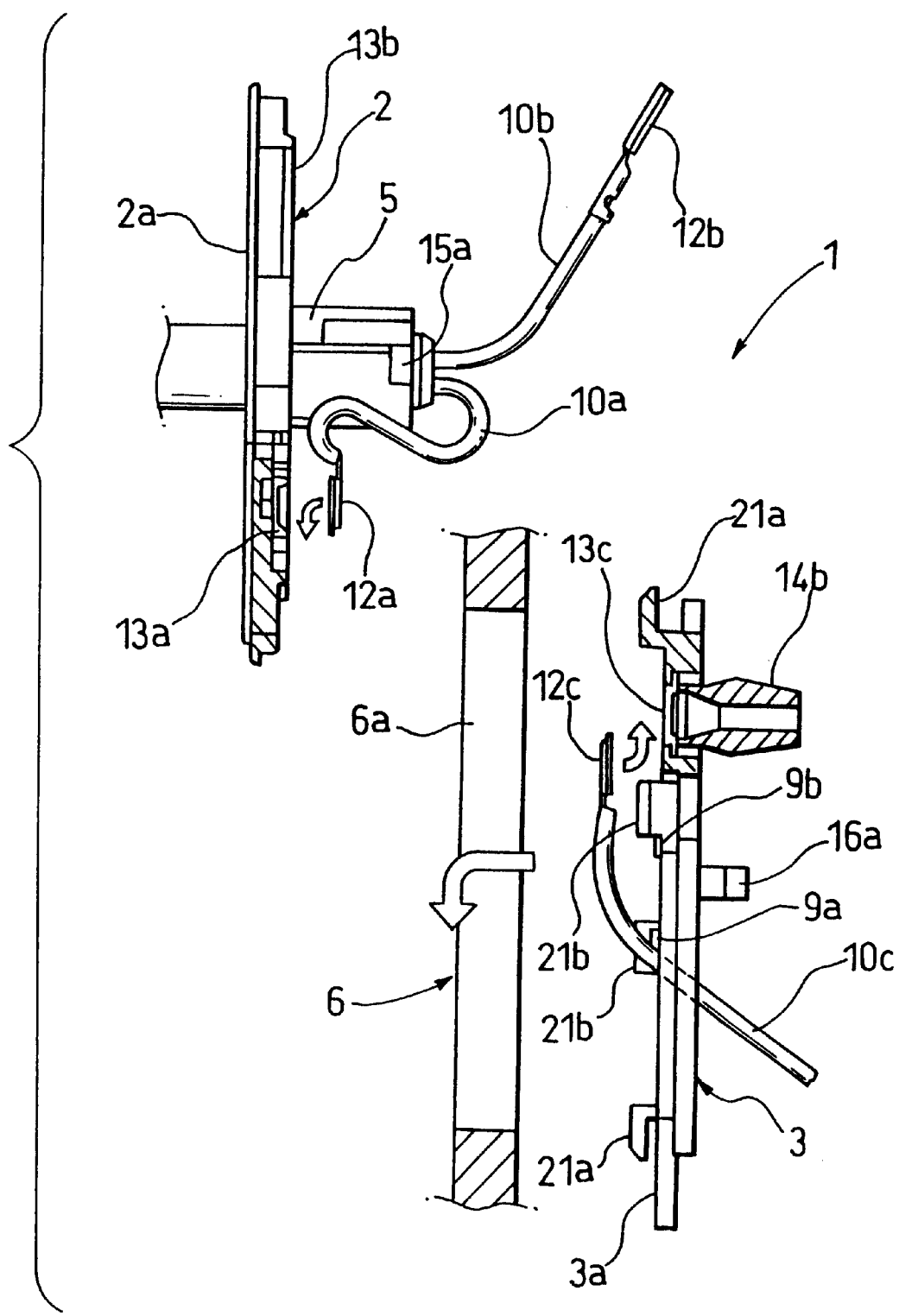
FIG. 4 is an exploded sectional view showing the modular connector according to the invention before it is fitted to a vehicle panel.

In the meantime, a terminal 12c attached to an end of a power supply electric wire 10c on the joint connector side guided out from the vehicle is passed through the bore 14 in the connector 3 and received in a recess 13c formed in a back face of the connector 3 at a position where the locking portion 18a is provided (see FIG. 4).

Figure 5:
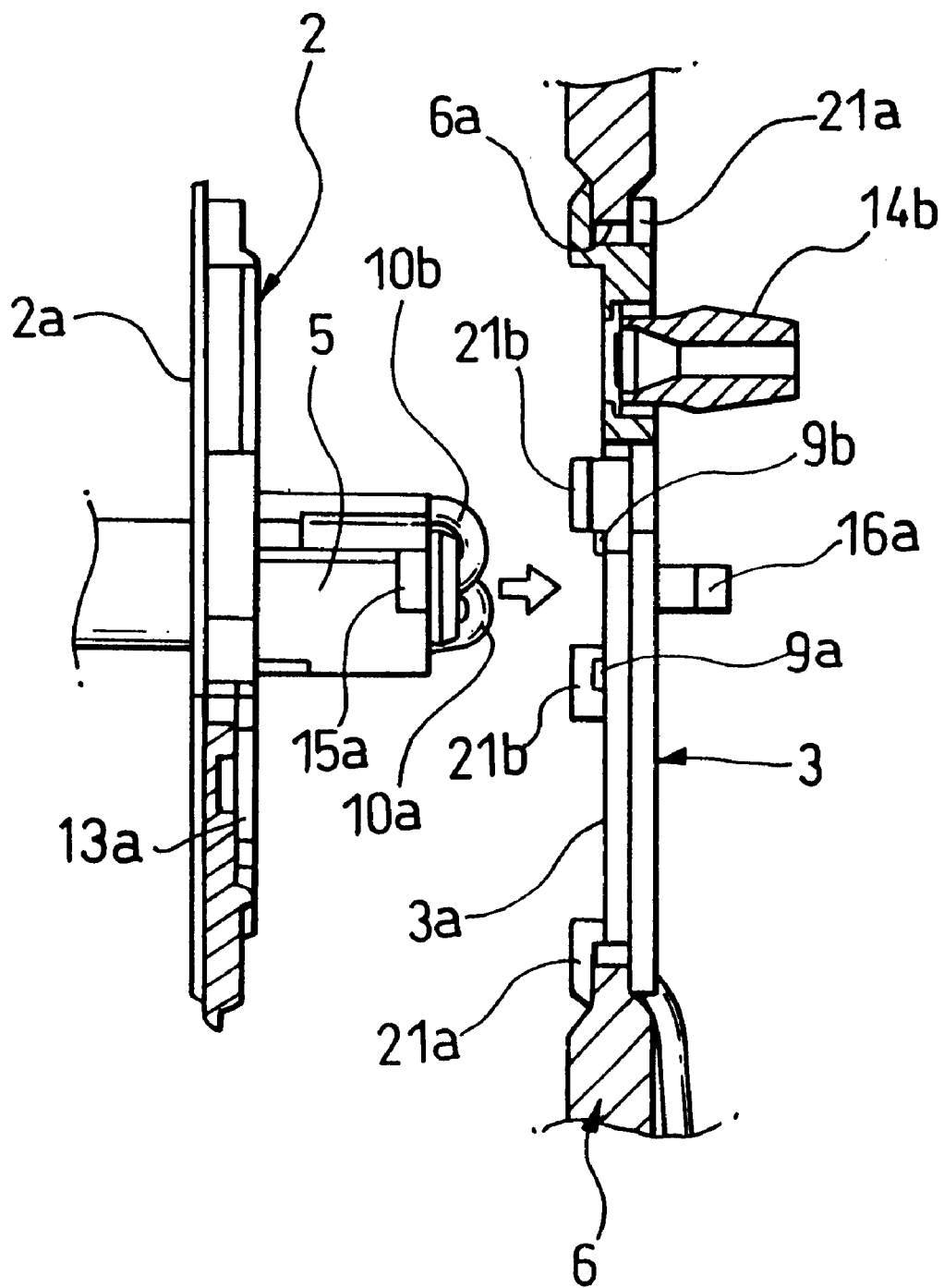
FIG. 5 is an exploded sectional view showing a state wherein the connector has been attached to a roof trim.
Figure 6:
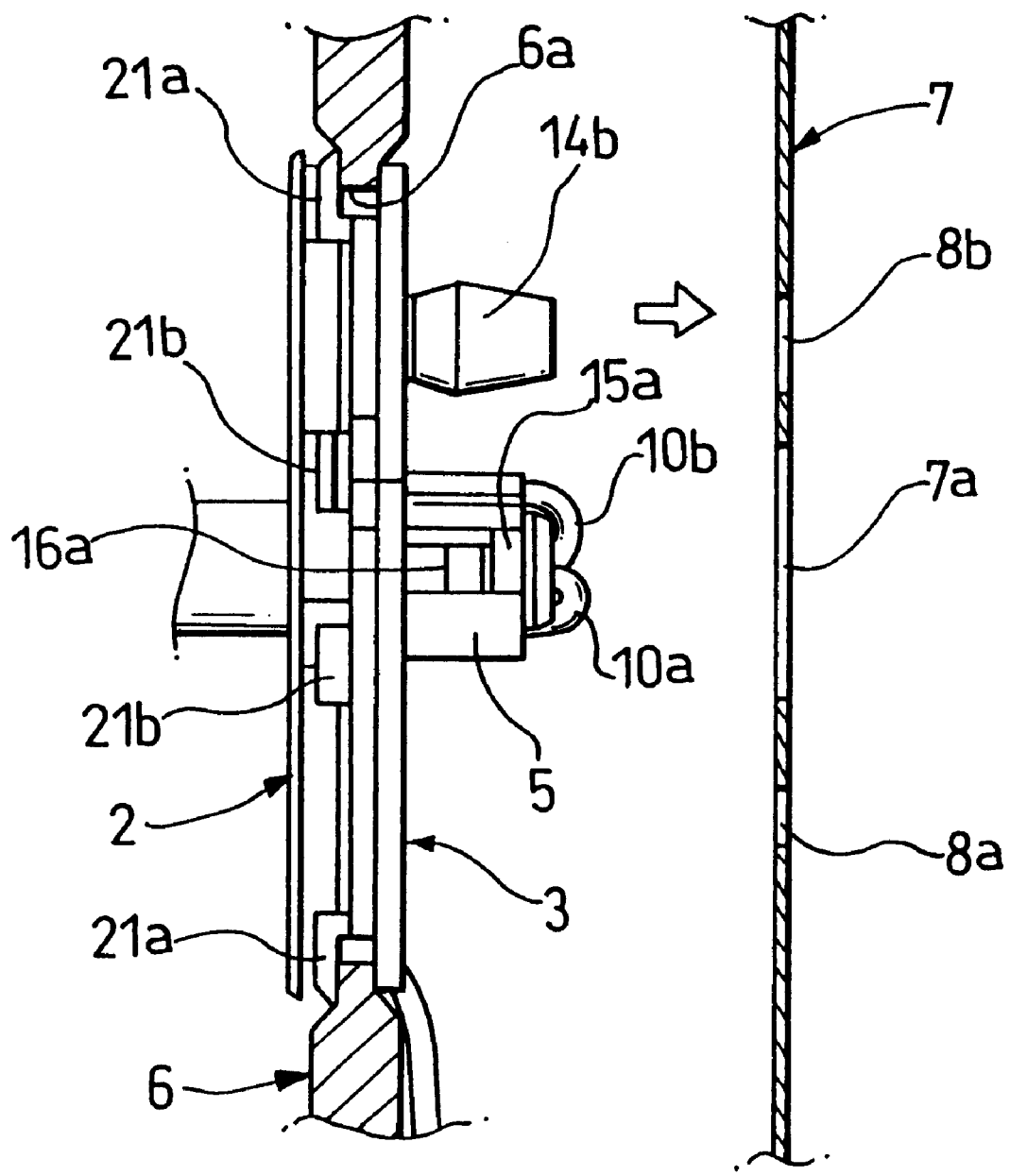
FIG. 6 is a sectional view showing a state wherein the bracket has been engaged with the connector.
Figure 7:
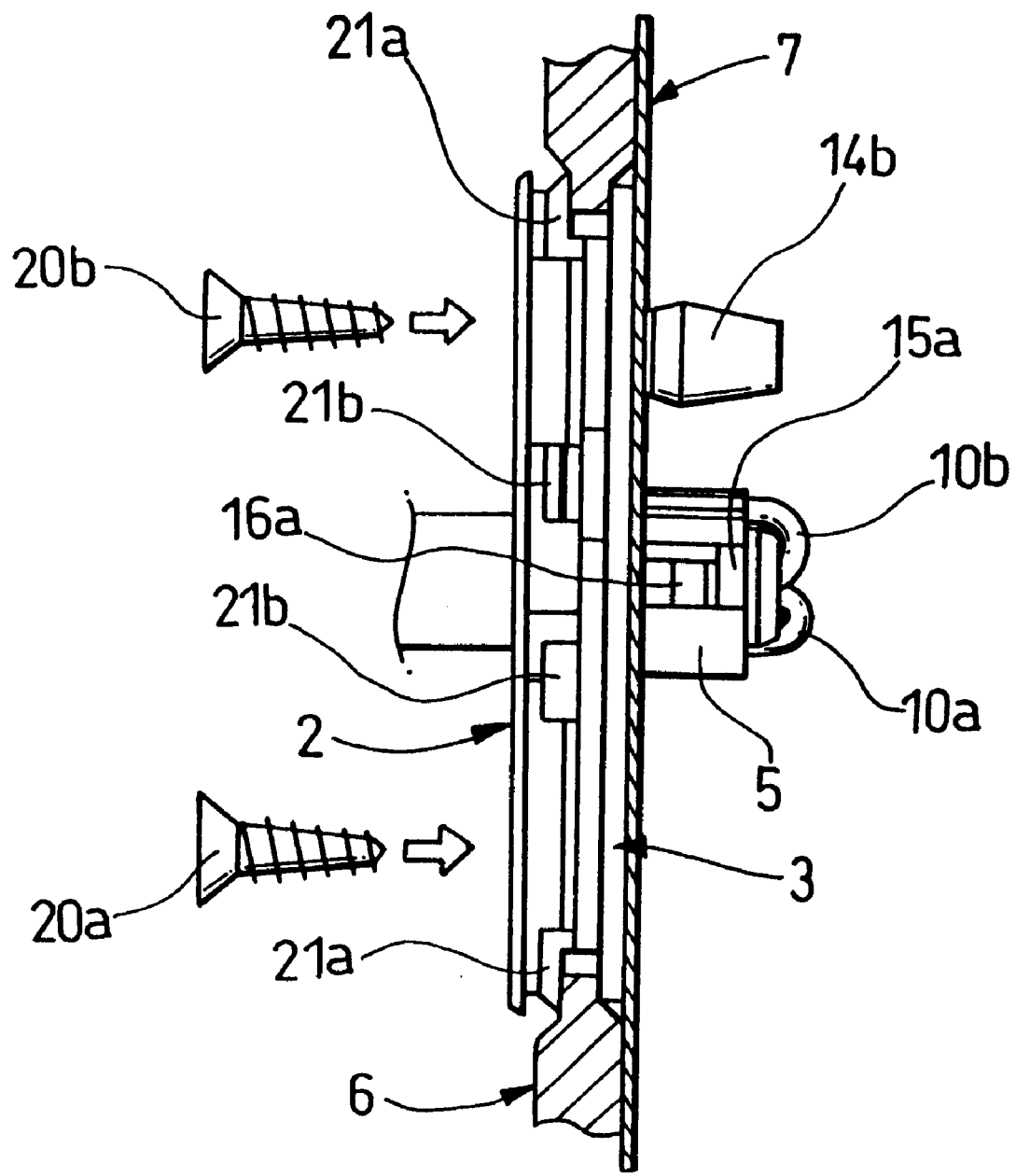
FIG. 7 is an exploded sectional view showing a state wherein the modular connector has been mounted on the vehicle panel.
Figure 8A:
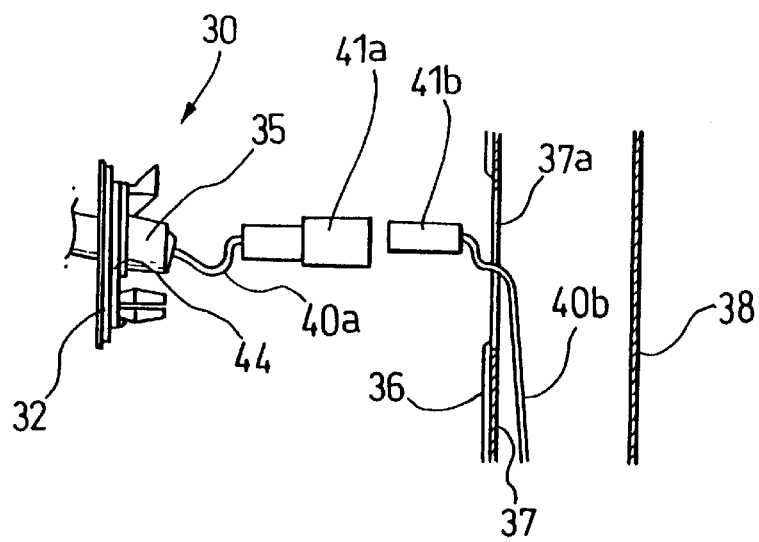
FIGS. 8A to 8C are sectional views showing respective steps of fitting a related modular connector fitting structure.
Figure 8B:
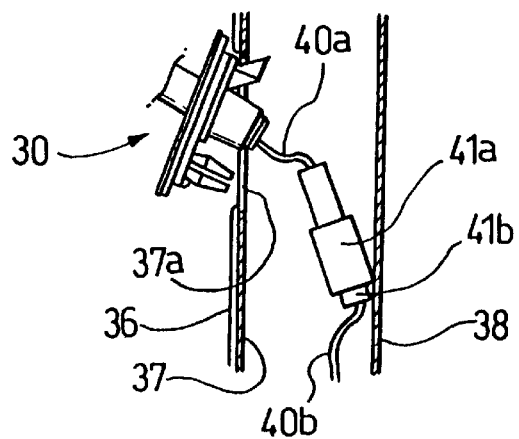
Figure 8C:
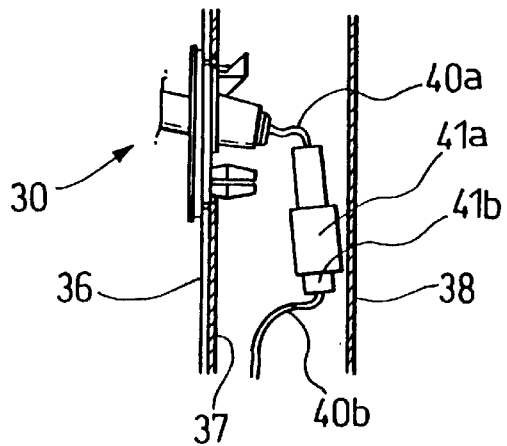
Figure 9:
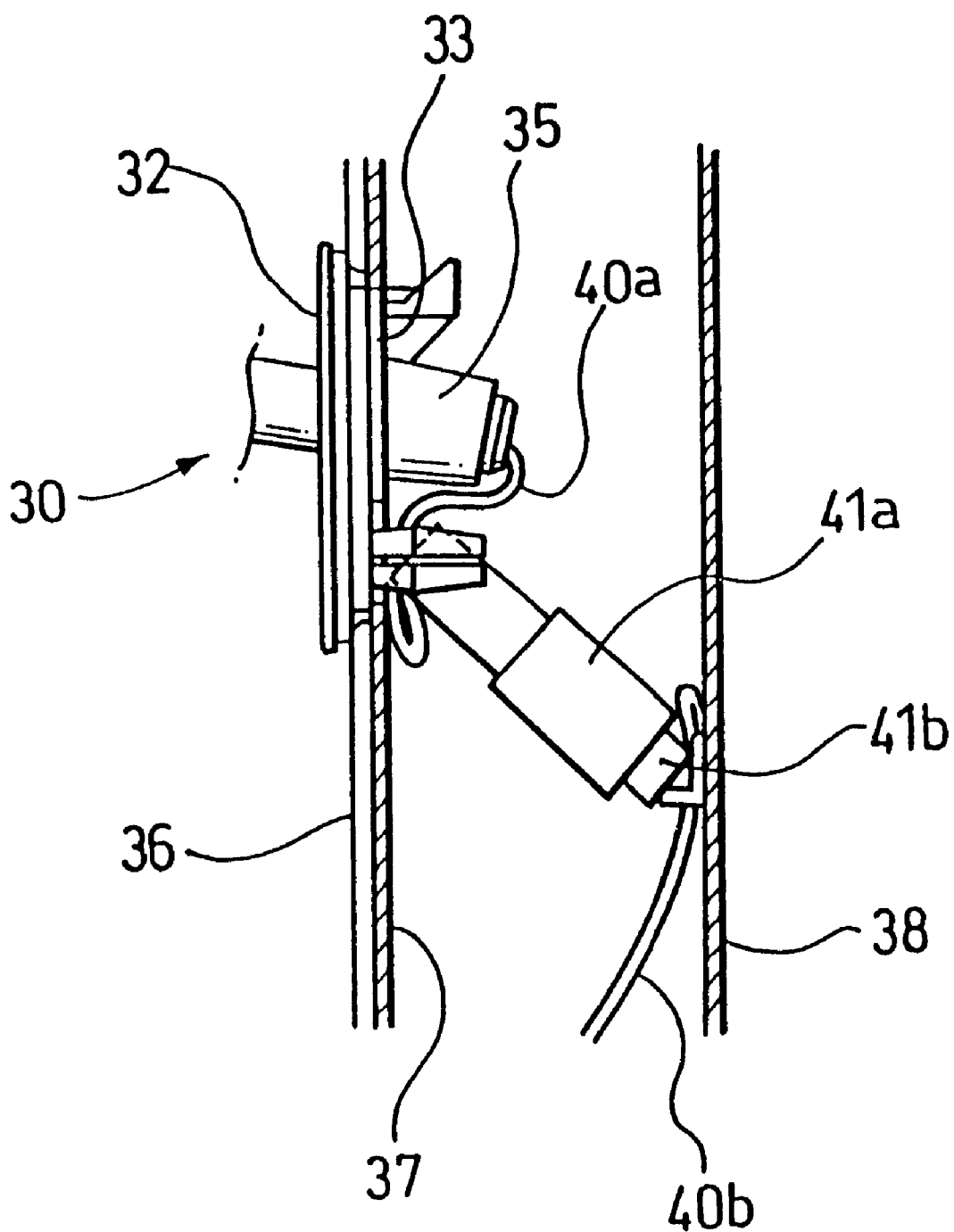
FIG. 9 is a sectional view showing an unfavorable state of the related connector mounted on the vehicle panel.

Then, the connector 3 is inserted in the fitting hole 6a in the roof trim 6, locked by means of the locking pieces 21a, 21b formed at the outer circumference of the connector 3, and thus, mounted on the roof trim 6 (see FIG. 5).

Then, the bracket 2 is mounted on the connector 2 by inserting the wire insertion tube 5 of the bracket 2 into the bore 14 of the connector 3. On this occasion, the locking arms 16a, 16b provided on the connector 3 temporarily ride on the locking hooks 15a, 15b provided on the bracket 2 and are engaged with the locking hooks 15a, 15b thereafter. Thus, the bracket 2 can be reliably mounted on the connector 3 (see FIG. 6).

Then, the wire insertion tube 5 of the modular connector 1, that is, the wire insertion tube 5 of the bracket 2 is inserted into a fitting hole 7a in the vehicle panel 7, and at the same time, the locking member 14b of the connector 3 is fitted and locked in a fitting hole 8b in the vehicle panel 7. Then, the modular connector 1 is fixed to the vehicle panel 7 by tightening the screws 20a, 20b (see FIG. 7).

The take-in electric wire 10a and the power supply electric wire 10c are electrically connected through these tightening screws 20a, 20b, while the take-in electric wire 10b is connected to the ground thereby bringing a lamp provided on the sun visor into electrical conduction. Thereafter, the cover 4 is attached to the bracket 2 on the vehicle room side.

In the modular connector fitting structure in this embodiment, since the projections 9a, 9b are provided at the lower face of the circumferential area of the bore 14 in the connector 3, the connector 3 and the bracket 2 are assembled to each other, and when the wire insertion tube 5 is fitted in the bore 14, the projections 9a, 9b provided at the lower face of the circumferential area of the bore 14 are brought in contact with an upper face of the bracket 2.

Accordingly, when the connector 3 is mounted on the bracket 2, the circumferential part of the wire insertion tube 5 is axially deflected around the projections 9a, 9b as fulcrums thereby to create elastic forces, and thus, the bracket 2 is tightly fitted to the connector 3 in a reliable manner. Therefore, even though there are more or less variations in working precision of the components, the backlash between the bracket 2 and the connector 3 in an axial direction will be eliminated, and thus, strange noises due to the backlash will not occur.

Provided that the backlash between the bracket 2 and the connector 3 has been eliminated, they are relatively simply and accurately engaged, and the working efficiency will be enhanced.

Further, although the projections 9a, 9b are in a triangular shape in cross section, and are continuously provided in the circumferential area of the bore 14 which is in contact with the wire insertion tube 5, the projections 9a, 9b may be provided at an appropriate interval in the circumferential area.

Moreover, the terminal 12c connected to the electric wire 10c for the power source extending from the vehicle is directly connected to the terminal 12b of the one take-in electric wire 10b attached to the lower face of the connector 3 through the screw 20b, while the terminal 12a of the other take-in electric wire 10a attached to the lower face of the connector 3 is directly connected to the vehicle (vehicle body) through the screw 20a to be grounded.

In the meantime, because the electric wires 10a, 10b which have been drawn out from the wire insertion tube 5 are held by the wire holders 28a, 28b and connected to the terminals 12a, 12b, the excess length of the electric wires is no longer required in the modular connector side.

Therefore, because the excess length of the electric wires for the modular connector is minimized, the electric wires and so will not get in touch with the vehicle panel 7 or the outer wall panel thereby preventing occurrence of the strange noises, and the damages of the electric wires and so will be prevented.

In addition, the bracket 2 is provided with the positioning ribs 17a, 17b and the connector 3 is provided with the positioning recesses 18a, 18b in this embodiment. Therefore, when the bracket 2 is engaged with the connector 3, the positioning ribs 17a, 17b are locked with the positioning recesses 18a, 18b so that the bracket 2 is relatively simply and accurately positioned on the connector 3. Accordingly, efficiency of the fitting work of the modular connector 1 will be enhanced.

Furthermore, the slits 19a, 19b for creating the elastic forces are formed near the outer circumferences of the positioning recesses 18a, 18b. Accordingly, the area in the outer peripheral face of the wire insertion tube 5 where the positioning ribs 17a, 17b are formed and the adjacent area are elastically pressed by the wall face of the bore 14 where the positioning recesses 18a, 18b and the slits 19a, 19b are formed. Therefore, the wire insertion tube 5 is always kept in a state press-fitted in the bore 14, thereby eliminating the backlash in a radial direction.

When the bracket 2 is engaged with the connector 3, there will be created angle adjusting feeling between the locking position and the lock releasing position, and the bracket 2 will be accurately positioned with respect to the connector 3. At the same time, the backlash in the radial direction will be eliminated the strange noises attributed to the backlash can be prevented.

In addition, because the slits 19a, 19b are in an arcuate shape, substantially uniform elastic forces are created on the wall face of the bore 14 in which the slits 19a, 19b are formed.

Accordingly, the positioning ribs 17a, 17b and the adjacent area are pressed with the substantially uniform elastic forces thereby eliminating the backlash between the bracket 2 and the connector 3 especially in a horizontal direction.

Although the embodiment according to the invention has been described hereinabove, the invention is not limited to the above described embodiment, but appropriate modifications and improvements, etc. can be made.

For example, the above described embodiment is constructed in such a manner that the backlash in the axial direction is prevented by the assembled structure of the slits and the projections, while the backlash in the radial direction is prevented by the assembled structure of the positioning projections and the positioning recesses. However, the structure may be such that the backlash in only one direction is prevented by either one of the assembled structures.

Moreover, the positioning ribs are provided on the wire insertion tube while the positioning recesses are provided around the bore in the above described embodiment. However, contrarily, the positioning ribs may be formed around the bore while the positioning recesses may be provided in the wire insertion tube respectively.

Further, although the projections are in a triangular shape in cross section in the above described embodiment, they may be in a semi-circular shape, rectangular shape or any other desired shape in cross section.

Further, although the slits are in an arcuate shape in the above described embodiment, they may be in an V-shape or in any other shape.

Moreover, the above described embodiment has been described referring to the modular connector fitting structure for supporting the sun visor. However, the invention is not limited to such embodiment, but can be applied to the modular connector fitting structure for supporting the room lamps.

What is claimed is:

1. A vehicle connector module comprising:

a bracket including a base plate and a tube portion protruded from the base plate;

a first electric wire inserted through the tube portion, extended along an outer peripheral face of the tube portion and fixed on the base plate of the bracket;

a plate-shaped connector provided with a bore to which the tube portion of the bracket is inserted to be engaged with the bracket, and provided with a slit so formed as to surround a part of an outer peripheral portion of the bore such that the outer peripheral portion is deformable in a radial direction of the bore when the bracket and the connector are engaged with each other; and a second electric wire inserted through the bore of the connector and fixed on a face of the plate-shaped connector facing the base plate of the bracket.

2. The connector module as set forth in claim 1, wherein a protrusion is formed on the outer peripheral portion of the bore of the connector, between the bore and the slit, such that the protrusion is abutted against the base plate of the bracket such that the outer peripheral portion of the bore surrounded by the slit in the connector is deformable in an axial direction of the tube portion of the bracket when the bracket and the connector are engaged with each other.

3. The connector module as set forth in claim 1, wherein the slit is formed into an arc shape surrounding a part of the outer peripheral portion of the bore of the connector.

4. The connector module as set forth in claim 1, wherein a rib member is formed on the outer peripheral face of the tube portion of the bracket, and a positioning recess is formed on an inner face of the deformable part of the bore.

5. The connector module as set forth in claim 1, wherein a first terminal provided on a leading end of the first electric wire and a second terminal provided on a leading end of the second electric wire are arranged so as to face each other when the bracket and the connector are engaged with each other; and wherein a screw for combining the bracket and the connector is pierced through the first and second terminals to electrically connect with each other.

* * * * *